Patented Sept. 9, 1941

2,255,072

UNITED STATES PATENT OFFICE 2,255,072

STEROL DERIVATIVES AND PROCESS OF FORMING SAME

Russell Earl Marker, State College, Pa., assignor to Parke, Davis & Company, Detroit, Mich., a corporation of Michigan No Drawing. Application April 13, 1936, Serial No. 74,223

6 Claims. (Cl. 260—397.2)

The invention relates to new sterol derivatives, and in particular to new derivatives of cholesterol and methods for their preparation.

Compounds of the sterol type having a cyclopentano phenanthrene framework of four condensed ring systems, are known to include many physiologically important compounds, including sex hormones, vitamins, etc. Derivatives of cholesterol have received particular attention because cholesterol is a comparatively abundant raw material found in nature. However, an isomer of cholesterol, namely, epi-cholesterol, has not yet been prepared, in spite of many attempts in that direction.

An object of the invention is to reverse the spatial configuration on the carbon atom to which the halogen atom of a sterol halide is attached; that is, on the halide carbon atom. A further object of the invention is the preparation of epi-cholesterol and new derivatives of the same in pure form or in the form of mixtures. Another object of the invention is a method for the preparation of new derivatives of cholesterol.

I have found that the above and other objects can be obtained by converting a sterol halide, possessing asymmetry at the carbon atom to which the halogen is attached, (i. e. at the halide carbon atom), into its Grignard campound by reaction with magnesium and then decomposing the Grignard compound to eliminate magnesium and obtain a mixture. The mixture can be separated to give a sterol derivative with an opposite configuration on the halide carbon atom from that started with. The original compound, or a derivative of the same as the case may be, and having the same configuration, is also obtained at the same time. Taking cholesterol as an example of the original sterol, it can be converted to cholesteryl halide, such as the chloride or bromide, and the latter reacted with magnesium to produce a Grignard compound, which may or may not be further transformed into a relatively unstable Grignard complex. The Grignard compound or its complex is next decomposed to give a mixture of a cholesterol and epi-cholesterol type of compound. The epi-cholesterol compound can then be separated from the mixture. It differs structurally from the cholesterol compound due to spatial rearrangement which has been produced on the carbon atom No. 3 of the sterol skeleton.

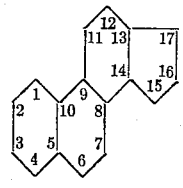

Sterol skeleton

The Grignard complex formed from the original Grignard compound (i. e. from the cholesteryl magnesium chloride or bromide type of compound) may consist of various known compounds capable of forming a complex with the Grignard compound and which complex is then capable of being decomposed, as by reaction with water, to give the desired epi-cholesterol type of compound.

After obtaining the mixture of cholesterol and epi-cholesterol, or their corresponding derivatives, as the case may be, the mixture can be treated so as to obtain epi-cholesterol separate from cholesterol, or derivatives of epi-cholesterol separate from their corresponding cholesterol derivatives. Of course, cholesterol or its derivatives can be recovered during the process, and this is especially important when it is desired to isolate the new derivatives of cholesterol described herein.

The invention will be more readily comprehended by referring to the following examples given merely by way of illustration without intending to limit the invention in any way to the mere details and materials disclosed in these examples.

Example 1

Preparation of epi-cholesterol from cholesteryl chloride.—A Grignard reagent is prepared from 0.124 mole of cholesteryl chloride. This is cooled to $-7°$ and a slow stream of dry oxygen is passed over the surface of the vigorously stirred solution for 8 hours under a pressure of 40 mm. of mercury. During this time the temperature is allowed to slowly rise to 0°. The Grignard complex is decomposed by pouring into about 500 cc. of ice-cold 5% sulfuric acid. The ethereal solution is separated, washed with water, filtered and then evaporated. The residue is extracted with 50 cc. portions of 95% alcohol, giving 5 grams of white powder which upon recrystallization from alcohol gives a melting point of 127–132° (uncor.). This mixture of epimeric 3-hydroxy-$\Delta^5$-cholestenes is sublimed in high-vacuum at 150°. A solution of 1.2 g. of the sublimate in 50 cc. of alcohol is added to a solution of 2 g. of digitonin in 200 cc. of alcohol. After standing for one hour, the precipitate is filtered to separate the cholesterol and the alcoholic filtrate evaporated to dryness. The residue containing epi-cholesterol is extracted with ether, filtered, and the ether evaporated. The residue, 480 mg., is crytallized 4 times from alcohol, m. 135–137° C. The product does not give a precipitate with digitonin. It absorbs bromine readily. A mixture with a small amount of cholesterol (m. 147–148°) gives a depression in melting point of 12°.

Analysis: Calc. for $C_{27}H_{46}O$, C, 83.9; H, 12.0. Found C, 84.1; H, 11.8.

In addition to the separation step (with digitonin) described in this example and the elementary analysis obtained, further conclusive proof that the compound obtained is epi-cholesterol, can be produced by catalytically reducing it to give the known compound, epi-cholestanol. This is illustrated by the following example.

*Example 2*

*Preparation of epi-cholestanol from epi-cholesterol.*—A solution of 70 mg. of epi-cholesterol in 50 cc. of dry ether is shaken with 100 mg. of platinum oxide catalyst under hydrogen at 45 pounds pressure for one hour. The catalyst is filtered, the ether evaporated and the remaining white solid is recrystallized twice from alcohol, m. 182–183°. A mixture with epi-cholestanol from the reduction of cholestanone gives no depression in melting point.

Analysis: Calc. for $C_{27}H_{48}O$, C, 83.4; H, 12.5. Found, C, 83.4; H, 12.7.

It will be readily apparent from the above description of the invention that valuable new compounds in the physiologically important field of sterols can now be prepared, which are not only directly useful but which can be used as starting points in the synthesis of other valuable compounds in this class.

Some of the subject matter disclosed but not claimed in this application is claimed in my copending application, Serial No. 194,013, filed March 4, 1938.

What I claim as my invention is:

1. Method for producing an epi-cholesterol type of compound from a cholesteryl halide which comprises converting said halide to cholesteryl magnesium halide, reacting the latter with oxygen to produce a relatively unstable complex with the cholesteryl magnesium halide, decomposing said complex to obtain a mixture wherein one constituent of the mixture is an epi-cholesterol type compound, and separating the mixture into its isomers and separately obtaining said isomers.

2. In a process for the production of epi-cholesterol from a cholesteryl halide, the steps comprising converting the halide to a cholesteryl magnesium halide, combining oxygen with the latter to obtain a complex magnesium compound and decomposing said complex compound by water to produce a mixture of cholesterol and epi-cholesterol.

3. Process for the production of epi-cholesterol from cholesteryl chloride comprising converting the chloride to cholesteryl magnesium chloride, combining oxygen with the latter to obtain a complex magnesium compound, decomposing said complex compound by water to produce a mixture of cholesterol and epi-cholesterol, separating the mixture into its isomers, and separately obtaining said isomers.

4. Epi-cholesterol, a solid melting at approximately 135–137° C. not precipitable from its alcoholic solution by digitonin, and capable of reduction by hydrogen to yield epi-cholestanol.

5. In the process of reversing the spatial configuration about an asymmetric halide carbon atom of a steryl halide, the steps which comprise reacting the halide with magnesium to form a Grignard type of compound and reacting the latter with oxygen to form a complex with said Grignard type of compound which is capable of being decomposed with water to eliminate magnesium.

6. In the process of reversing the spatial configuration about an asymmetric halide carbon atom of a cholesteryl halide, the steps which comprise reacting cholesteryl halide with magnesium to form magnesium halide and reacting the latter with oxygen to form a complex with cholesteryl magnesium halide which is capable of being decomposed with water to eliminate magnesium.

RUSSELL EARL MARKER.